Jan. 26, 1965 G. M. MILLER 3,167,742

MAGNETIC REPRODUCING APPARATUS

Filed Nov. 7, 1960 2 Sheets-Sheet 1

INVENTOR.
GEORGE M. MILLER
BY
Samuel E. Turner

INVENTOR.
GEORGE M. MILLER
BY
Samuel E. Turner

United States Patent Office 3,167,742
Patented Jan. 26, 1965

3,167,742
MAGNETIC REPRODUCING APPARATUS

George M. Miller, Mountain View, Calif., assignor to General Electric Company, a corporation of New York Filed Nov. 7, 1960, Ser. No. 67,717
11 Claims. (Cl. 340—146.3)

This invention relates to magnetic reproduction and particularly to apparatus for reading human language symbols which have been printed on a document with an ink capable of being magnetized. More specifically, the invention relates to symbol reading apparatus comprising a multichannel reading transducer and associated circuits by which the adverse effects of extraneous magnetic particles in the document are reduced.

A United States Patent No. 2,924,812, issued February 9, 1960 to P. E. Merritt and C. M. Steele for an Automatic Reading System, which is assigned to the same assignee as the instant invention, describes and claims a system for automatically reading human language which is printed on documents as symbols in ink capable of being magnetized. As shown in this patent, the symbols are magnetized and then translated in sequence past a reading transducer which has a single wide transducer by which printed symbols are scanned. The transducer thereby generates a distinctive electrical waveshape for each symbol. This symbol representing waveshape is applied to a wave transmission means in the form of a delay line which is provided with a plurality of spaced symbol sampling taps for detecting voltages at corresponding points of the waveshape. For recognition of a waveshape a plurality of transmission channels, one for each of the waveshapes to be recognized, are each connected to the sampling taps through a respective waveshape correlation network. Each of the channels is thereby adapted to produce an output signal greater than that produced by and other of the channels when a corresponding waveshape is in a predetermined position in the delay line. A symbol presence timing circuit is responsive to signals produced by the leading portion of a symbol waveshape to sense the position of a waveshape in the delay line and produce a sample signal. When the waveshape reaches the predetermined or sampling position the transmission channel having the highest output at the time of the sample signal produces a signal on an output lead corresponding to the detected symbol.

In practice magnetic symbol bearing documents are found to contain imperfections such as extraneous magnetic material. For example, magnetic wastes such as iron particles can become imbedded in the document when it is manufactured. Such iron particles are generally very small as compared to the area of the printed symbol. However, such iron particles can be many times greater in thickness than the thickness of the magnetic ink and in general they have a greater density of magnetic material.

The reading transducer, of course, responds to extraneous magnetic particles and signals therefrom can be higher in amplitude than the signals from the printed symbols. The high signals from extraneous magnetic particles can cause spurious signals in the symbol recognition circuits with the result, for example, that outputs on more than one of the symbol output leads are produced. The high amplitude signals from extraneous magnetic particles which preceded a printed synbol can cause that it appears to the recognition circuit as the waveshape of a different symbol. Furthermore, extraneous magnetic particles which precede a printed symbol can cause premature initiation of the operation of the symbol presence timing circuit. By the structures of the present invention high amplitude signals from small areas of the document are detected and the adverse effect thereof is substantially overcome.

It is therefore an object of the invention to provide an improved magnetic symbol reading system.

Another object of the invention is to prevent substantial distortion of the symbol waveshape by signals from extraneous magnetic particles.

Another object is to prevent premature initiation of the operation of the symbol presence timing circuit of a symbol reading system by a signal from a small area of the symbol bearing document.

Another object of the invention is to separately read narrow strips of medium bearing magnetic material.

Another object of the invention is to detect a signal above a predetermined amplitude derived from a predetermined minimum number of narrow strips of a medium bearing magnetic material.

Another object of the invention is to limit to a predetermined level the signals obtained from small areas of a medium bearing magnetic material.

These and other objects of the invention are achieved by a symbol reading arrangement which employs a multichannel reading transducer in place of the single channel reading transducer of the prior art. The multichannel transducer is, in effect, a series of separate, narrow reading transducer elements arranged closely spaced with their gaps in alignment to form the multichannel unit. Each elemental transducer thus scans a narrow strip of the printed symbol. The extraneous magnetic particles in a document are generally smaller in diameter than the width of the area which is scanned by one of the transducer elements. Thus, an extraneous magnetic particle generally causes a signal in only one (or perhaps in two adjacent ones) of the transducer elements.

In the illustrated embodiments of the invention the output of each transducer element is separately connected to a respective limiting circuit. The outputs of the limiting circuits are fed to a summing amplifier, the output of which constitutes the composite symbol signal. Thus high amplitude signals from individual transducer elements are clipped by the associated limiter circuits and thereby prevented from reaching the symbol recognition circuit.

In a first embodiment of the invention the output of the summing circuit is also fed to an enable timing circuit in the form of a threshold circuit, the threshold level of which is set such that signals through the summing circuit from one (or a predetermined few) of the limiting circuits is insufficient to cause the threshold circuit to produce an output signal. Thus signals from small areas of magnetic material will not cause the threshold circuit to produce an output signal. However, the leading edge of a symbol is always of such height as to energize several transducer elements whereas extraneous magnetic particles practically never energize more than two of the transducer elements. Thus signals from a predetermined number of the transduced elements indicate the presence of a symbol and it is arranged that the threshold circuit thereupon produces an output signal, hereinafter called an "enable timing" signal, which may be used to enable the symbol presence timing circuit of the symbol recognition system. Thus by this circuit, high amplitude signals from small areas of magnetic material, such as extraneous magnetic particles, are prevented from initiating the operation of the timing circuit.

The relatively simple first embodiment of the invention is suitable for many symbol reading applications. However, difficulties may arise where wide variations in symbol signal amplitude are encountered. It will be appreciated that symbols are not always uniformly printed; for example, the thickness and density of the magnetic ink can vary from document to document. For these and other reasons the signals obtained vary in amplitude from document to document.

The threshold circuit of the first embodiment must of course be set such that the leading edge of a symbol producing the lowest permissible signal amplitude will produce the enable timing signal. The limiting circuits must be set accordingly, that is, at a limiting level just above the lowest permissible symbol signals, for otherwise an enable timing signal could be produced by high amplitude signals from only one or two of the transducer elements.

Since in the first embodiment the limiting circuits must be set at a limiting level just above the lowest permissible symbol signals then it is apparent that the limiting circuits will rather drastically clip relatively high amplitude symbol signals. It has been found that this can result in an undesirably low signal-to-noise ratio of the output symbol signal from the summing circuit to the delay line.

Therefore, to accommodate wide variations in symbol signal amplitude without degrading the signal-to-noise ratio of the signal to the delay line, a second embodiment of the invention is provided wherein the outputs of the limiting circuits are quantized for the purpose of producing the enable timing signal. A circuit which is responsive to input signals above a predetermined amplitude to produce an output signal of predetermined fixed amplitude (such as the well-known Schmitt trigger circuit) is connected to receive the signals from each limiting circuit. The signals from these circuits are applied to a threshold circuit the output of which constitutes the enable timing signal.

Thus in this second embodiment of the invention, the setting of the limiting level of the limiting circuits is not constrained by considerations of the enable timing circuitry but instead may be set to limit high amplitude signals from small areas of the document while not unduly limiting relatively high amplitude symbol signals.

The invention will be described in greater detail with reference to the accompanying drawings in which.

*First embodiment*

Figure 1:
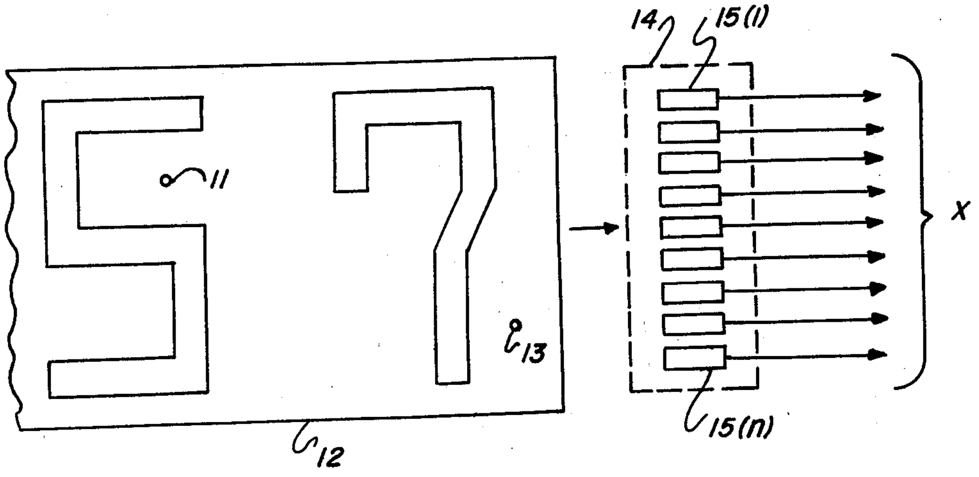
FIGURE 1 is an enlarged view of two printed symbols and a representation of a multichannel transducer to show the relationship of the transducer elements to the printed symbols.

Shown in FIG. 1 is a portion of a document 12 on which magnetic symbols are printed. Illustrated greatly enlarged are the symbols "5" and "7" which are representative of a plurality of symbols to be read and recognized. A pair of extraneous magnetic particles are illustrated as 11 and 13, however, it may be appreciated that extraneous magnetic particles may occur anywhere in the document. The extraneous magnetic particles 11 and 13 are illustrated in the positions shown for the purpose of explaining hereinafter certain specific difficulties caused by such extraneous magnetic particles.

Also in FIG. 1 there is shown a multichannel reading transducer 14 made up of a plurality of separate transducer elements 15(1)–15($n$). Nine such transducer elements are illustrated in FIG. 1. However, this is not to be understood as a limitation of the invention. In general good results are obtained if the width of each transducer element is in the order of or less than the width of the horizontal bars of the symbol. For example, as illustrated in FIG. 1, the transducer element 15(1) scans the upper horizontal bars of the symbols. A suitable multichannel transducer is shown by Kenneth W. Gardiner in a United States patent application Serial No. 68,910 filed November 14, 1960 for a Multichannel Transducer, which is assigned to the same assignee as the instant invention.

It is assumed that the magnetic material on the document, including the printed magnetic symbols, has previously been magnetized by, for example, passage adjacent a permanent magnet as shown in FIG. 6 of the above mentioned U.S. Patent No. 2,924,812. When the document 12, FIG. 1, is then passed adjacent the transducer 14 each transducer element responds to the rate of change of the magnetic field of the magnetized material passing adjacent thereof and produces a corresponding signal waveshape.

Figure 2:
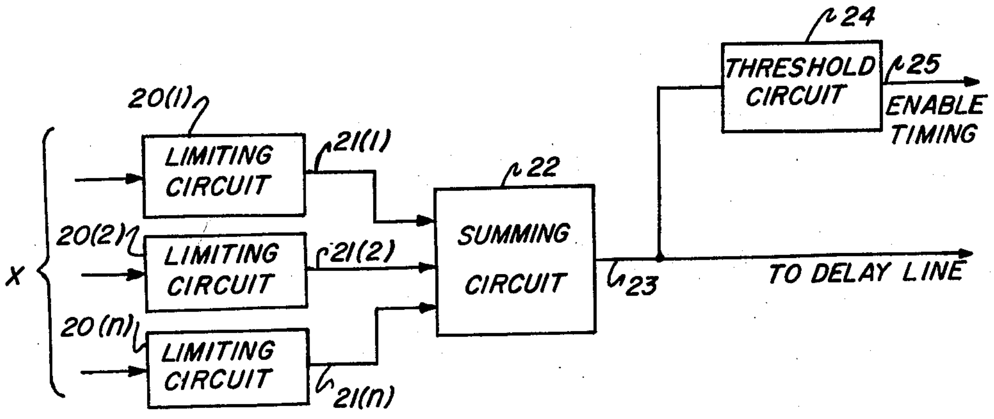
FIGURE 2 is a schematic diagram of the circuit of a first embodiment of the invention.

In the illustrated embodiments of the invention the individual leads from the transducer elements 15(1)–15($n$), shown collectively as X, are each connected to a respective one of a plurality of limiting circuits 20(1)–20($n$) as shown in FIG. 2. For purposes of illustration only three such limiting circuits 20(1)–20($n$) are shown in FIG. 2. It is to be understood, however, that there is an individual limiting circuit for each of the transducer elements 15(1)–15($n$). (The limiting circuits may be double parallel diode limiters as shown by Keith Henny in "Radio Engineering Handbook," Fourth Edition, Chapter 10, FIG. 29, McGraw-Hill Book Company Inc., New York, 1950.)

The limiting level of each of the limiting circuits 20(1)–20($n$) is set to just above the level of the lowest permissible amplitude symbol signals received from the transducer elements. A plurality of output leads 21(1)–21($n$) from the limiting circuits 20(1)–20($n$) are each connected to a respective input terminal of a summing circuit 22. The summing circuit 22 is operable to produce an output on a lead 23 which is proportional to the sum of the amplitudes of the signals on the leads 21(1)–21($n$). Thus the signal on the lead 23 is a composite symbol signal of all the signals produced by transducer elements 15(1)–15($n$). (A summing amplifier is shown by G. A. Korn in "Electronic Analog Computers," page 11, McGraw-Hill Book Co., Inc., New York, 1952.)

When a high amplitude signal is produced by one of the transducer elements, for example, in response to an extraneous magnetic particle, the amplitude thereof is limited by the respective limiting circuit and the high amplitude signal therefore has no appreciable effect on the symbol signal at the output lead 23. Thus high amplitude signals produced from small areas of the document are prevented from having a significant adverse effect on the symbol recognition circuits (not shown) which are connected to the output lead 23.

For a more complete appreciation of the operation of the circuit just described reference is again made to the symbols illustrated in FIG. 1. As is explained in the above mentioned U.S. Patent No. 2,924,812, magnetic symbols are recognized by the relative position and amplitude of signals from the magnetic discontinuities of a symbol. Notice, for example, that the symbol "7" is formed with three vertical portions or bars whereas the symbol "5" is formed with only two vertical bars. However, if an extraneous magnetic particle 11 is positioned as illustrated within the area of the symbol "5" then this extraneous magnetic particle 11 constitutes another magnetic discontinuity. Thus if a single channel transducer is employed it produces signals in response to these three magnetic discontinuities, namely, the two vertical bars of the symbol "5" along with the extraneous magnetic particle 11. The composite waveshape thus produced could be mistaken by the symbol recognition circuits as the waveshape of the symbol "7." However, when the structure of the present invention is employed, the extraneous magnetic particle 11 causes a signal in only one of the transducer elements 15(1)–15($n$). If this signal is of high amplitude it is clipped by the corresponding one of the limiting circuits 20(1)–20($n$). It thus causes little distortion of the symbol waveshape and the symbol is therefore correctly recognized.

As previously suggested extraneous magnetic particles such as 13 which are situated ahead of a symbol can cause premature initiation of operation of the symbol presence timing circuit. As is explained in the above mentioned U.S. Patent No. 2,924,812, in a complete symbol reading system a timing circuit is employed which is responsive to the leading portion of a symbol to relate the operation of the symbol recognition circuit to the position of a symbol waveshape in the delay line. When a single channel transducer is employed extraneous magnetic particles such as 13 may be mistaken for the leading edge of a symbol. In the arrangement of the present invention this premature operation is prevented by requiring signals from at least two and preferably three of more of the transducer elements 15(1)–15($n$) before the symbol presence timing circuit is enabled. In one practical system the leading edge of each symbol is at least three transducer elements in which; thus signals from at least three transducer elements may appropriately be required to initiate operation of the timing circuit.

To achieve this result there is provided in the circuit of FIG. 2 an enable timing circuit in the form of a threshold circuit 24 connected to the output of the summing circuit 22. (The well-known Schmitt trigger circuit may be employed as the threshold circuit 24.) The level of threshold circuit 24 may be set such that signals are required from at least three of the limiting circuits 20(1)–20($n$) before an output signal is produced by the threshold circuit on a lead 25. This output signal on lead 25 is used to enable the symbol presence timing circuit (not shown).

*Second embodiment*

Figure 3:
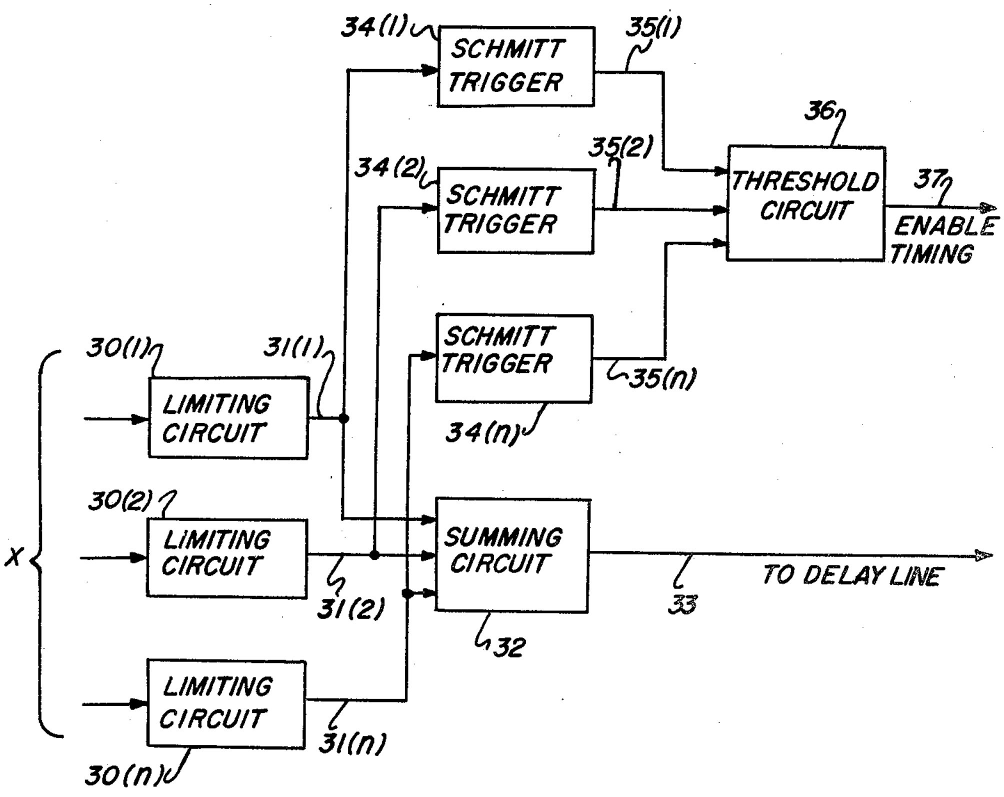
FIGURE 3 is a schematic diagram of the circuit of a second embodiment of the invention.

A circuit of second embodiment of the invention is shown in FIG. 3. As discussed hereinbefore this second embodiment has the facility of more effectively accommodating wide variations in the amplitude of the signals produced by the reading transducer without causing a significant decrease in the signal-to-noise ratio of the signal to the delay line.

As in the first embodiment the signals from each of the trmansducer elements 15(1)–15($n$) are fed through a respective limiting circuit 30(1)–30($n$) to respective input terminals of a summing circuit 32 and the output of the summing circuit on a lead 33 constitutes the composite symbol which is sent to the delay line (not shown).

However, the enable timing circuit is different. The enable timing circuit of the second embodiment includes a plurality of circuits 34(1)–34($n$) each of which provides a predetermined fixed amplitude output signal in response to input signals above a predetermined amplitude. Such circuits may preferably take the form of the well-known Schmitt trigger circuit as indicated in FIG. 3. As shown in FIG. 3, each of the Schmitt trigger circuits 34(1)–34($n$) is connected by a respective one of the leads 31(1)–31($n$) to the output terminals of the limiting circuits 30(1)–30($n$).

The Schmitt trigger circuits are designed to produce predetermined fixed amplitude output signals on a plurality of respective leads 35(1)–35($n$) in response to the lowest permissible amplitude of symbol signals through the limiting circuits 30(1)–30($n$) from the leading edge of a symbol.

The output signals from the Schmitt trigger circuits are applied over the leads 35(1)–35($n$) to respective input terminals of a threshold circuit 36. The threshold circuit 36 is preferably a summing gate. A summing gate is a circuit which produces an output signal in response to more than a predetermined number of discrete input signals. (A suitable summing gate is shown by Abraham I. Pressman in Chapter 8 of "Design of Transistorized Circuits for Digital Computers," John F. Rider Publisher, Inc., New York, 1959). As hereinbefore mentioned, in a known practical system the leading edge of the symbols always produces signals in at least three of the transducer elements 15(1)–15($n$); therefore the threshold circuit 36 may be designed to produce an enable timing signal on a lead 37 in response to signals from three or more of the Schmitt trigger circuits 34(1)–34($n$). Since extraneous magnetic particles generally cause signals in no more than two of the transducer elements such particles cannot produce the enable timing signal. Since the Schmitt trigger circuits provided fixed amplitude output signals in response to input signals above a predetermined level then the operation of the enable timing circuit is practically independent of the setting of the limiting level of limiting circuits 30(1)–30($n$). The limiting level of the limiting circuits may therefore be set in consideration of providing adequate limiting of signals from extraneous magnetic particles without causing undue limiting of relatively high amplitude symbol signals.

While the principles of the invention have been made clear in the illustrative embodiments there will be obvious to those skilled in the art, many modifications in structure, arrangement, proportion, the elements, materials, and components, used in the practice of the invention and otherwise which are particularly adapted for specific environments and operating requirements without departing from those principles. The appended claims are therefore intended to cover and embrace all such modifications within the limits only of the true spirit and scope of the invention.

What is claimed is:

1. Apparatus for reading symbols printed on a document with magnetic ink comprising: a reading transducer comprising a plurality of separate transducer elements each individually responsive to the passage of magnetic portions of a printed document adjacent thereto; a plurality of signal limiting devices each connected to a respective one of said transducer elements and each operable to limit the signal from the connected transducer element to a predetermined amplitude; a summing circuit connected to said devices and operable to produce a signal proportional to the sum of the signals from said devices; and a signal threshold device connected to said summing circuit and operable in response to a signal above a predetermined amplitude from said summing circuit to produce an output signal.

2. In apparatus for reading symbols printed on a document with magnetic ink, means for distinguishing between the leading edge of magnetic symbols and small particles of magnetic material comprising: a multichannel magnetic reading transducer responsive to the passage of magnetic portions of said printed document adjacent thereto; a plurality of signal responsive devices each connected to a respective one of the channels of said transducer and each operable to produce an output signal proportional to a signal from the connected transducer channel within a predetermined amplitude range; and means connected to said devices and operable to detect the simultaneous occurrence of output signals above a predetermined amplitude from a predetermined minimum number of said devices.

3. In apparatus for reading symbols printed on a document with magnetic ink, means for distinguishing between the leading edge of magnetic symbols and small particles of magnetic material comprising: a multichannel magnetic reading transducer responsive to the passage of magnetic portions of said printed document adjacent thereto; and a circuit connected to said transducer channels for individually limiting the output signal from each of said channels and for detecting the simultaneous occurrence of signals above a predetermined amplitude from a predetermined minimum number of said transducer channels.

4. In apparatus for reading symbols printed on a document with magnetic ink, means for distinguishing between the leading edge of magnetic symbols and small particles of magnetic material comprising: a reading transducer comprising a plurality of separate transducer elements each individually responsive to the passage of magnetic portions of a printed document adjacent thereto; and means connected to said transducer elements for individually limiting the signal from each of said separate transducer elements and operable in response to simultaneous signals above a predetermined amplitude from at least two of said elements to produce a symbol presence signal.

5. Apparatus for detecting areas of magnetic material having a width greater than a predetermined width comprising: a magnetic transducer comprising a plurality of separate transducer elements each individually responsive to the passage of magnetic material adjacent thereto to produce a signal; and means connected to said transducer elements for individually limiting the signal from each of said separate transducer elements and operable in response to simultaneous signals from at least two of said elements to produce a manifestation of the occurrence of said simultaneous signals.

6. In apparatus for reading symbols printed on a document with magnetic ink, means for reducing the effect of extraneous magnetic particles within the field of the printing comprising: a multichannel magnetic reading transducer responsive to the passage of magnetic portions of said printed document adjacent thereto; a plurality of signal limiting circuits; means connecting individual channels of said transducer to respective ones of said limiting circuits; a signal summing circuit operable to produce a signal output proportional to the sum of the signals applied to its input; and means connecting the output of each limiting circuit to a respective input of said summing circuit.

7. In apparatus for reading symbols printed on a document with magnetic ink, means for reducing the effect of extraneous magnetic particles within the field of the printing comprising: a multichannel magnetic reading transducer responsive to the passage of magnetic portions of said printed document adjacent thereto; a plurality of signal limiting devices each connected to a respective one of the channels of said transducer; and means for combining the outputs from said signal limiting devices.

8. In apparatus for reading symbols printed on a document with magnetic ink, means for distinguishing between the leading edge of magnetic symbols and small particles of magnetic material comprising: a reading transducer comprising a plurality of separate transducer elements each individually responsive to the passage of magnetic portions of a printed document adjacent thereto; a plurality of signal limiting devices each connected to a respective one of said transducer elements and each operable to limit the signal from the connected transducer element to a predetermined amplitude; a plurality of circuits each connected to a respective one of said signal limiting devices and each responsive to a signal above a predetermined amplitude from the connected signal limiting device to produce an output signal; and a threshold device connected to receive said signals from said plurality of circuits and operable in response to the simultaneous receipt of at least a predetermined number of said signals to produce an output signal.

9. Apparatus for detecting magnetic material having a width greater than a predetermined width comprising: a reading transducer comprising a plurality of separate transducer elements each individually responsive to the passage of magnetic material adjacent thereto; a plurality of circuits each responsive to an input signal above a predetermined amplitude to produce an output signal; means connecting each of said transducer elements to a respective one of said plurality of circuits; and a threshold device connected to receive said signals from said plurality of circuits and operable in response to at least a predetermined number of said signals to produce an output signal.

10. Apparatus for reading symbols printed on a document with magnetic ink comprising: a reading transducer comprising a plurality of separate transducer elements each individually responsive to the passage of magnetic portions of a printed document adjacent thereto; a plurality of signal limiting devices each connected to a respective one of said transducer elements and each operable to limit the signal from the connected transducer element to a predetermined amplitude; a summing device connected to receive outputs from said signal limiting devices and operable to produce a signal proportional to the sum of said outputs; a plurality of circuits each connected to a respective one of said signal limiting devices and each responsive to a signal above a predetermined amplitude from the connected signal limiting device to produce an output signal; and a threshold device connected to receive said sginals from said plurality of circuits and operable in response to the simultaneous receipt of at least a predetermined number of said signals to produce an output signal.

11. Apparatus for detecting magnetic material having a width greater than a predetermined width comprising: a reading transducer comprising a plurality of separate transducer elements each individually responsive to the passage of magnetic material adjacent thereto; a plurality of circuits each responsive to an input signal above a predetermined amplitude to produce an output signal; means connecting each of said transducer elements to a respective one of said plurality of circuits; and means connected to receive the output signals from said circuits and operable to manifest the receipt of signals from at least a predetermined number of said circuits.

References Cited by the Examiner

UNITED STATES PATENTS

| | | | |
|---|---|---|---|
| 2,531,642 | 11/50 | Potter | 340—174.1 X |
| 2,733,301 | 1/56 | Bradbury | 179—100.2 |
| 2,839,615 | 6/58 | Sarratt | 340—174.1 |
| 2,897,351 | 7/59 | Melton | 340—15 X |
| 2,897,476 | 7/59 | Widess | 340—15 |
| 2,916,724 | 12/59 | Peterson | 340—15 |
| 2,924,812 | 2/60 | Merritt | 340—149 X |
| 2,927,303 | 3/60 | Elbinger | 340—149 |
| 2,933,246 | 4/60 | Rabinow | 340—149 X |
| 2,961,649 | 11/60 | Eldredge et al. | 340—149 |

MALCOLM A. MORRISON, *Primary Examiner.*

JOHN F. BURNS, *Examiner.*